United States Patent [19]
Wilson

[11] Patent Number: 5,558,120
[45] Date of Patent: Sep. 24, 1996

[54] VANDALPROOF CONTROL STOP CAP

[75] Inventor: John R. Wilson, Naperville, Ill.

[73] Assignee: Sloan Valve Company, Franklin Park, Ill.

[21] Appl. No.: 429,084

[22] Filed: Apr. 26, 1995

[51] Int. Cl.⁶ .................................................. F16K 27/12
[52] U.S. Cl. ........................................ 137/382; 137/377
[58] Field of Search ................................. 137/377, 382; 222/182; 220/724, 726, 727

[56] References Cited

U.S. PATENT DOCUMENTS

| 4,727,900 | 3/1988 | Dooling et al. | 137/382 X |
| 4,762,144 | 8/1988 | Ford | 137/377 X |

FOREIGN PATENT DOCUMENTS 2146412  4/1985  United Kingdom ................... 137/382

Primary Examiner—Kevin Lee
Attorney, Agent, or Firm—Dorn, McEachran, Jambor & Keating

[57] ABSTRACT

A vandalproof cap assembly for closing an access opening in a plumbing fitting includes a plastic sleeve formed and adapted to be normally non-removably attached to the plumbing fitting about the access opening. The plastic sleeve has a plurality of outwardly extending flexible projections. There is a cap with a smooth exterior and an interior recess which is snapped upon the sleeve so that the sleeve projections interlock with the cap recess. When so mounted the cap is freely rotatable relative to the sleeve, and can only be removed from the sleeve with a tool and specific knowledge as to use of the tool.

14 Claims, 1 Drawing Sheet

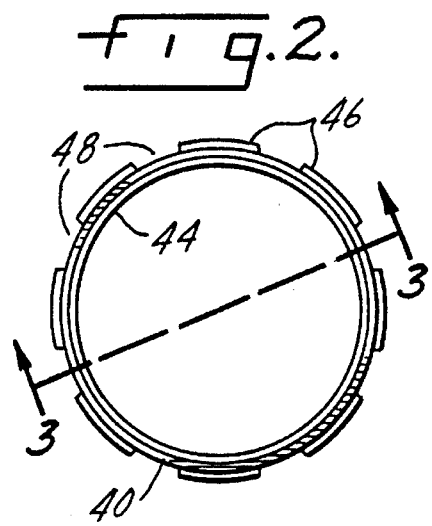
fig.2.
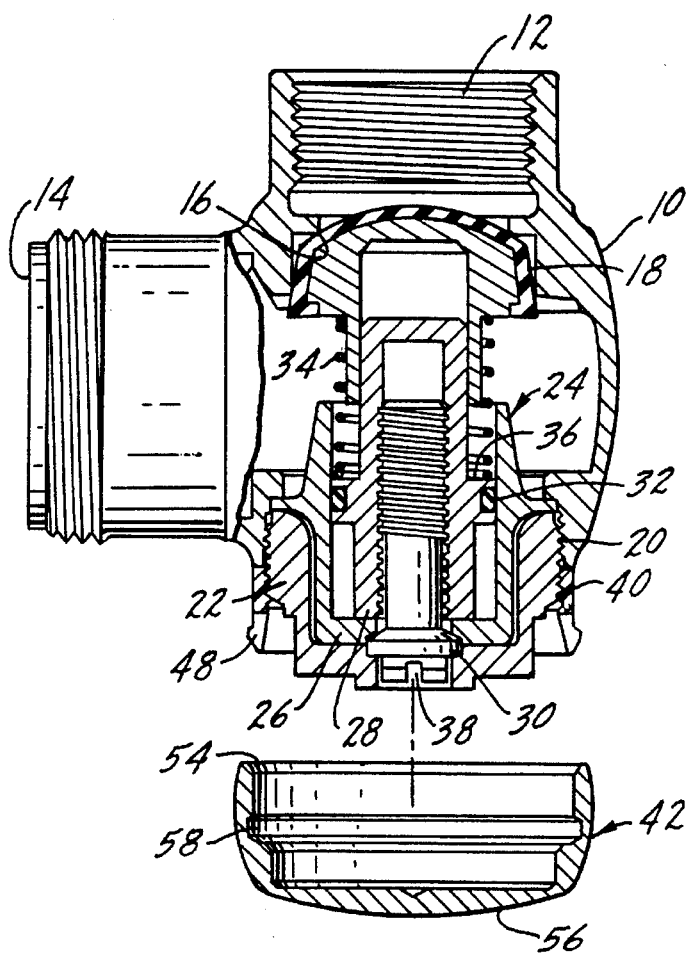
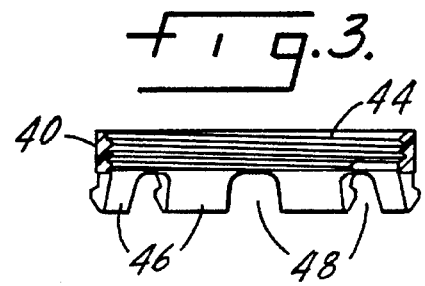
fig.3.
fig.1.
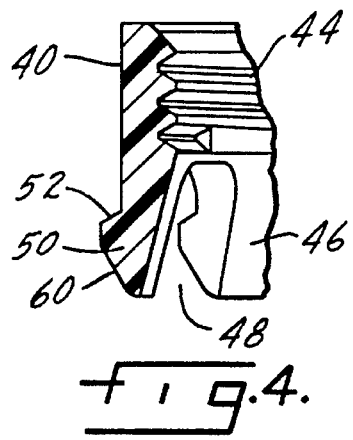
fig.4.
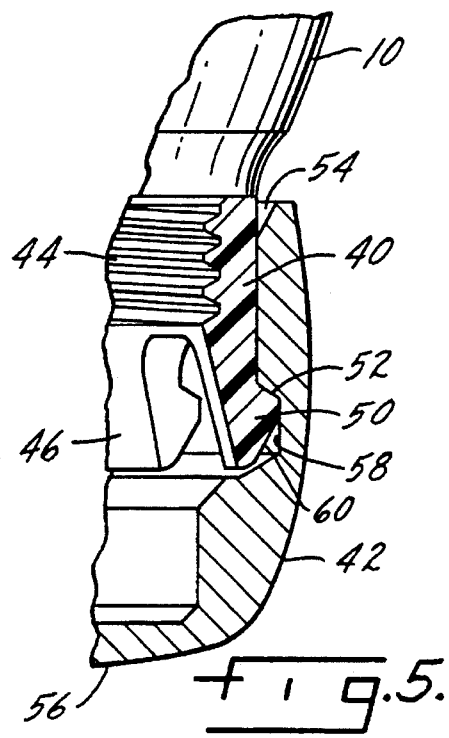
fig.5.

VANDALPROOF CONTROL STOP CAP

THE FIELD OF THE INVENTION

Public washrooms conventionally utilize flushometers to supply a measured amount of water to either a urinal or a water closet. Associated with such flushometers is a plumbing fitting designated as a control stop. This plumbing fitting connects the flushometer with the water supply and has a valve member biased toward a closing position. The bias upon the valve member is adjustable so as to control the water supply to the flushometer. Normally, the adjustment on the control stop is not utilized once the plumbing fitting has been installed except for those instances in which it is necessary to totally shut off the water supply to a flushometer. At such time maintenance personnel will remove the stop cap and close the valve member so that water is no longer supplied to the flushometer.

Unfortunately, such stop caps have been the object of vandalism. The stop caps are decorative and are often removed from the control stop exposing the adjustment to the valve member which then may also be subject to vandalism. A further problem associated with such control stops is one brought about by the difference in temperature between the room in which the control stop is located and the cold water which periodically flows through the control stop. The thermal cycle brought about by the repetitive change in temperature of the metallic control stop often reduces the torque required to remove the stop cap to essentially zero, making it easy to remove and only loosely held in position.

The present invention provides a vandalproof cap assembly for a control stop with the cap being freely rotatable when properly installed and only removable by a person utilizing the appropriate tool and with knowledge of how to remove the cap. Specifically, the cap assembly includes a plastic sleeve which will be threadedly engaged to the valve access opening on the control stop body. The plastic sleeve has a plurality of circumferentially disposed flexible fingers. The cap, which has a smooth exterior and an interior recess, will be snapped onto the flexible fingers of the sleeve. When so positioned, the cap is freely rotatable relative to the sleeve. It may only be removed from the sleeve by the use of a tool such as a screwdriver which pries the cap off. Usually, only maintenance personnel will be aware of this removal technique and will be equipped with the appropriate tool. Vandals will not normally know the technique nor would they normally have a screwdriver for such use. Further, the use of the plastic sleeve avoids the thermal cycle problem in that plastic is basically unaffected by changes in temperature brought about by the heat of the washroom and the cold water flowing through the control stop.

SUMMARY OF THE INVENTION

The present invention relates to vandalproof caps for plumbing fittings and in particular to a vandalproof cap for a control stop used in combination with a flushometer to provide water to a urinal or water closet.

A primary purpose of the invention is a cap assembly for a control stop which may not be removed without the appropriate tool and knowledge as to the use thereof.

Another purpose is a control stop which is not subject to the thermal cycles brought about by the flow of cold water through a valve located in a room at a substantially higher temperature.

Another purpose is a vandalproof control stop cap assembly made up of a plastic sleeve having flexible fingers and a cap for the sleeve having a smooth exterior and a recess which interlocks with the fingers.

Another purpose is a vandalproof control stop cap assembly as described in which the flexible fingers have hooks on the ends thereof, with the hooks having a blunted end to facilitate removal of the cap therefrom.

Other purposes will appear in the ensuing specification, drawings and claims.

BRIEF DESCRIPTION OF THE DRAWINGS

The invention is illustrated diagrammatically in the following drawings wherein:

FIG. 1 is an exploded side view, in part section, through a control stop as described herein;

FIG. 2 is an end view of the control stop cap assembly sleeve;

FIG. 3 is a section along plane 3—3 of FIG. 2;

FIG. 4 is an enlarged partial section of a portion of the sleeve; and

FIG. 5 is an enlarged section illustrating the interlock between the cap assembly sleeve and cap.

DESCRIPTION OF THE PREFERRED EMBODIMENT

Control stops are conventionally used with flushometers in public washrooms and as the name implies both control the flow of water to the flushometer and function as a stop when it is necessary to completely close the water supply to the flushometer for maintenance or removal. Control stops are well known in this art. Because it may be necessary to move the stop to a fully closed position, it is necessary that there be access to the stop for maintenance personnel. In the prior art the access opening was covered by a cap which was threaded onto the body of the control stop. There are problems with such a construction. First, the constant cycling between hot and cold caused by the warm temperature of the room and the cold temperature of the water results in a cap which is very loosely attached to the body. Little torque is required to remove it. The second problem is vandalism and the caps are both decorative and useful to vandals for other purposes. Once the cap has been removed, the exposed stop is an invitation to a vandal to either close the stop, preventing the flow of water to the flushometer, or to back off the stop in such a way that water constantly flows to the flushometer possibly resulting in flooding a urinal or closet. The present invention provides a vandalproof cap assembly which eliminates the above-described problems.

In the drawings, the body of the control stop is indicated at 10 and has a threaded inlet 12 and a threaded outlet 14. The outlet will be connected to a flushometer and the inlet will be connected to the water supply. There is a valve seat 16 formed adjacent the inlet 12, and a valve member or plug 18 is movable to close upon the valve seat, thus shutting off the flow of water between the inlet and the outlet.

The opening for the stop is indicated at 20 and a bonnet 22 is threadedly mounted in this opening. The bonnet 22 mounts a collar and sleeve subassembly 24 which includes a collar 26 holding a movable adjusting sleeve 28 which threadedly mounts a stem 30. An O-ring 32 forms a seal between the adjusting sleeve 28 and the interior of collar 26. A coil spring 34 is seated upon a shoulder 36 of the adjusting sleeve and biases the plug 18 toward the closed position shown in the drawings.

As is known in the art, rotation of the stem 30 will move the adjusting plug 28 toward or away from the plug 18. This movement changes the bias applied by the spring 34 on the plug 18, thus controlling the pressure required to move the plug away from seat 16 which movement takes place when the flushometer is operated. In order to completely close the control stop, the stem 30 will be turned through the use of the screwdriver slot 38 which will move the adjusting sleeve 28 to a position in which the plug 18 cannot be moved away from seat 16 and will be fast upon the seat. In this position the control stop is functioning as a stop and no water can pass through it.

The cap assembly which covers the access opening 20 and thereby hides the stem 30 and its screwdriver adjusting slot 38, comprises a plastic sleeve 40 and a metal cap 42. The plastic sleeve is formed of a flexible material and polysulfone is preferred. The sleeve 40 has an internal thread 44 by which the sleeve is threaded onto the exterior of the bonnet 20. The sleeve 40 has a plurality of axially extending fingers 46 which are uniformly spaced by gaps 48. Each of the fingers 46 has a hook portion 50 which will interlock and interengage with the cap 42 as described hereinafter. In order to facilitate removal of the cap 42 from the hook 50, there is a chamfered surface 52 on the hook which tends to blunt the point of the hook which holds the cap onto the sleeve.

The cap 42 has a smooth exterior surface and there are no tool engaging flats as is customary in the prior art stop caps. Thus, if the cap is gripped by the hand of a person or by a tool, there is no gripping surface. The cap 42 is hollow and at the entrance to the hollow interior there is a chamfered surface 54 which will be used in lining up the cap for inward movement so that it snaps upon the flexible sleeve 40. Generally intermediate the closed end 56 of the cap and the entering chamfered area 54 there is a recess 58 which will interlock with the hooks 50 on the sleeve 40. It should be noted that the exterior of the cap is curved and that the recess 58 is formed in the thickest walled portion of the cap so as to not structurally weaken the cap.

In use, once the flexible sleeve 40 has been attached to the bonnet, the cap 42 will be centered upon the sleeve by the use of the chamfered surface 54 and the opposed chamfered surface 60 of the sleeve 40. Inward movement of the cap will cause it to snap into place in which the hooks 50 will be positioned within the recess 58. When so positioned, the cap is freely rotatable upon the sleeve. Someone turning the cap will be unable to remove it.

Removal of the cap is brought about by placing a screwdriver or a similar tool between the edge of the cap and the adjacent portion of the bonnet and the cap is simply pried off. This is a repeatable process and neither the cap, bonnet, nor flexible sleeve are in any way damaged by periodic removal. The screwdriver which is used for removal is also the preferred tool of the maintenance man for adjusting the position of the stop as described above.

The present invention may be used as original equipment on newly manufactured control stops, but it also sized to fit existing control stops in the field so that the cap may be retrofitted onto existing plumbing equipment.

Whereas the preferred form of the invention has been shown and described herein, it should be realized that there may be many modifications, substitutions and alterations thereto.

The embodiments of the invention in which an exclusive property or privilege is claimed are defined as follows:

1. A control stop for use in a plumbing supply line including a body, an inlet and outlet in said body, a valve seat in said body and a valve member movable toward and away from said valve seat to control flow from said inlet to said outlet, an opening in said body providing exterior access to said valve member for adjustment thereof, the improvement comprising a vandalproof cap assembly for said opening, said cap assembly including a non-metallic sleeve attached to said body about said opening, and a cap mounted on said sleeve, said sleeve and cap having interengagement means thereon which permit free rotation of said cap relative to said sleeve and prevent removal of said cap from said sleeve except by a prying tool insertable between the cap and body to pry the cap away from the body and sleeve.

2. The control stop of claim 1 characterized in that said sleeve is formed of plastic and is threadedly attached to said body.

3. The control stop of claim 1 characterized in that said interengagement means includes a plurality of circumferentially disposed flexible fingers on said sleeve and a circumferential recess on the interior of said cap.

4. The control stop of claim 3 characterized in that each of said fingers has a hook portion on the end thereof.

5. The control stop of claim 4 characterized in that each hook portion is blunted for ease in cap removal.

6. The control stop of claim 3 characterized in that said fingers are uniformly spaced and extend axially outwardly from said body.

7. The control stop of claim 3 characterized in that said cap has a smooth exterior.

8. The control stop of claim 3 characterized in that said cap is hollow with a closed top and an open end, said recess being intermediate said top and open end and having a diameter larger than any adjacent portion of the cap hollow interior.

9. A vandalproof cap assembly for closing an access opening in a plumbing fitting, said cap assembly including a plastic sleeve formed and adapted to be normally non-removably attached to the plumbing fitting about the access opening, said plastic sleeve having a plurality of outwardly extending flexible projections thereon, and a cap having an interior recess formed and adapted to interlock with said flexible projections to mount said cap upon said sleeve, said cap when so mounted being freely rotatable relative to said sleeve, said cap being removable from said sleeve only by the use of a prying tool insertable between the cap and plumbing fitting.

10. The cap assembly of claim 9 characterized in that each of said projections has a hook portion on the end thereof.

11. The cap assembly of claim 9 characterized in that each of said projections is uniformly circumferentially spaced about said sleeve and extends axially outwardly therefrom.

12. The cap assembly of claim 9 characterized in that said cap has a smooth exterior surface thereon.

13. The cap assembly of claim 9 characterized in that said cap is hollow, with a closed top and an open end, said recess being intermediate said top and open end and having a diameter larger than any adjacent portion of the cap and hollow interior.

14. The cap assembly of claim 9 characterized in that said cap and sleeve allow for ease in assembly.

\* \* \* \* \*